United States Patent Office 3,477,629
Patented Nov. 11, 1969

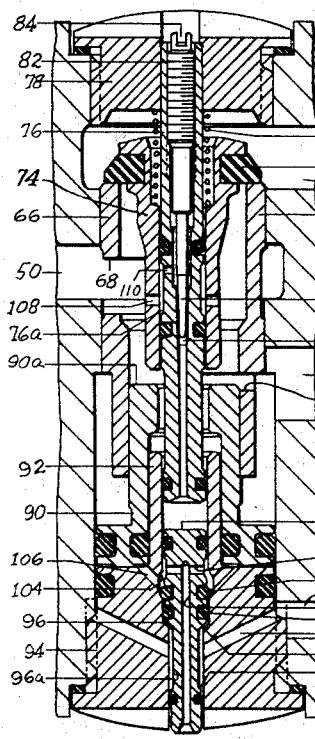

3,477,629
PNEUMATIC FASTENER APPLYING DEVICE
Carl T. Becht, Cincinnati, Ohio, assignor to Senco Products, Incorporated, Cincinnati, Ohio, a corporation of Ohio
Filed Nov. 23, 1966, Ser. No. 596,540
Int. Cl. B27f 7/22
U.S. Cl. 227—130          16 Claims

ABSTRACT OF THE DISCLOSURE

Pneumatic fastener applying device having control structure providing automatic repetitive cycling including cooperating passages and pneumatic valving between the main valve for the working cylinder and the operator controlled valve so that the operator controlled valve is effective via the passage and pneumatic valving to open the main valve; the passages and pneumatic valving are also arranged to utilize, only after the main valve has opened, fluid under pressure to permit the main valve to reclose even though the operator controlled valve remains actuated.

---

This invention relates to a pneumatic fastener applying device, and more particularly to a control structure by means of which the device will cycle repetitively and at high speed, each cycle being effective to drive a fastener into the work piece.

This invention has great and particular utility in connection with the specific pneumatic stapler illustrated and described in U.S. Patent 2,983,922, issued May 16, 1961, in the name of Albert G. Juilfs. This patent teaches the construction of a fastener applying device in which, upon actuation of a suitable trigger, fluid power is utilized to both drive the main piston in a working stroke, and to return this piston to its initial position after completion of the working stroke. The instant invention utilizes many of the principles of this patent, and incorporates a new and improved control structure, such that upon actuation of a suitable trigger, the device will cycle repetitively and at high speed until the trigger is released.

It is therefore a primary object of this invention to provide a control structure for achieving repetitive cycling of a fastener applying device. It will be understood that the phrase "repetitive cycling" as used in this application in connection with fastener applying devices contemplates a cycle including opposed working and return strokes, and in which each working stroke is effective to drive a fastener.

A further object of this invention is the provision of such a control structure which will permit higher cycling speeds than have heretofore been possible.

Still another object of this invention is to provide a control structure which is compact in design, such that it may be incorporated entirely within presently existing commercial devices.

A specific object of this invention is to provide a control structure which can be utilized to replace the main valve of commercial devices according to the above mentioned United States Patent, and which will effectively and at low cost convert such devices from the single shot mode of operation to the repetitive cycling or auto fire mode of operation.

During the course of the following detailed description of the invention, reference will be made from time to time to the accompanying drawings, in which:

FIGURE 2 is an enlarged cross sectional view of the control valve structure of this invention in its initial position;

FIGURE 3 is an enlarged cross sectional view similar to FIGURE 2 showing a further operating position of the control structure;

FIGURE 4 is an enlarged cross sectional view similar to FIGURE 3 showing a further operating position of the control valve structure;

FIGURE 5 is an enlarged cross sectional view similar to FIGURE 4 showing a further operating position of the control valve of this invention; and FIGURE 6 is an enlarged cross sectional view showing still a further operating position of the control valve of this invention.

Figure 1:
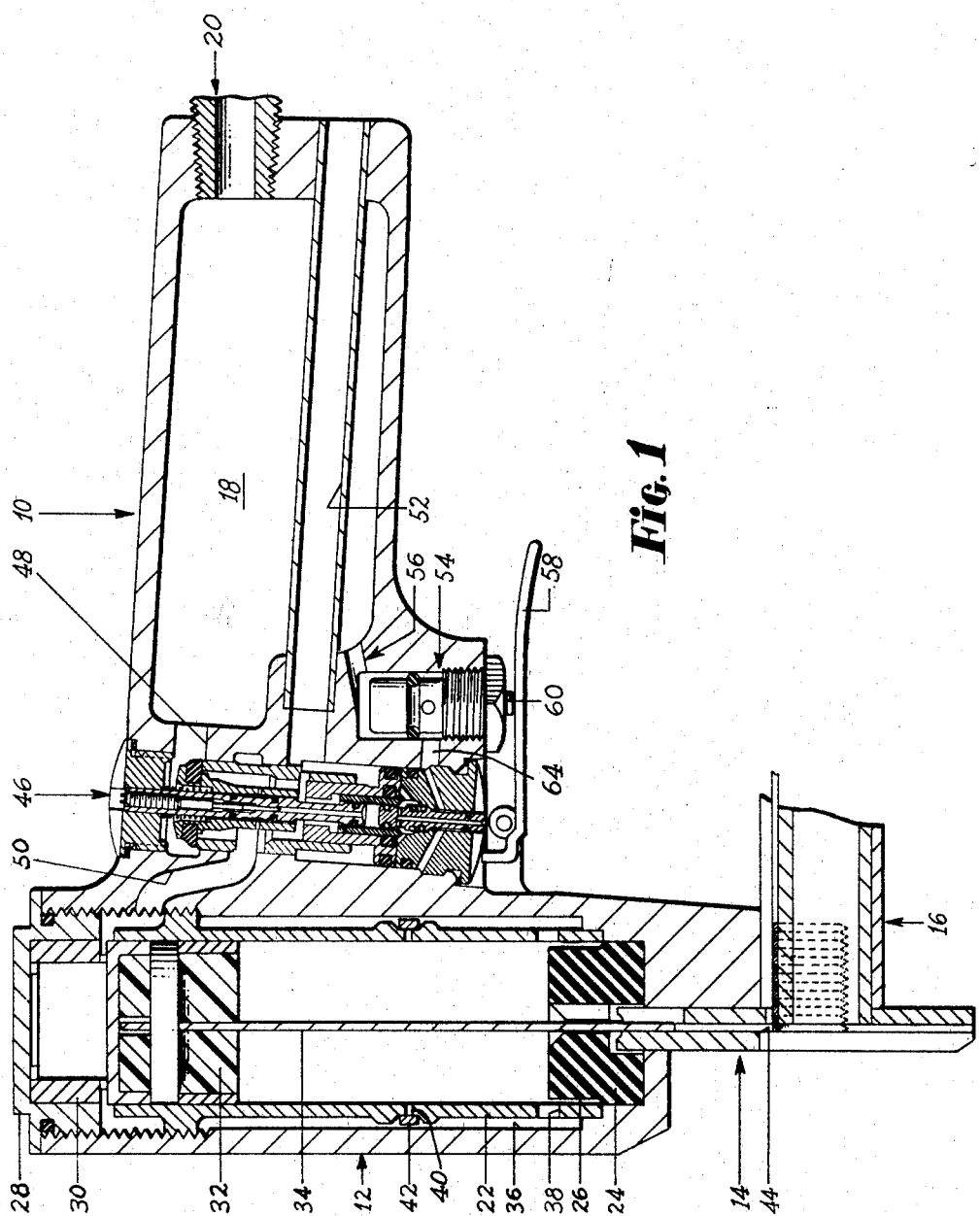
FIGURE 1 is a cross sectional view showing a pneumatic fastener applying device embodying the control structure of this invention.

Briefly considered, this invention contemplates a fastener applying device for use with a supply of fluid under pressure. As is conventional, such a device will include a working cylinder having a piston and fastener driver reciprocable therein in a cycle including a working stroke and a return stroke, a main valve for controlling the flow of the fluid under pressure into the working cylinder, and an exhaust valve for releasing the air under pressure from the working cylinder after the main valve has closed. Of course, the complete device will also include a magazine or other apparatus for successively feeding fasteners to be driven into the device.

This invention contemplates the provision of a control piston which is movable from an original position to a second position which is effective to both open the main valve and to close the exhaust from the working cylinder. Actuation of the trigger is effective, as explained in more detail hereinafter, to utilize a portion of the supply of compressed fluid to move the control piston from the first position to the second position, thereby opening the main valve and admitting compressed fluid to the working cylinder, driving the piston in a working stroke. A portion of the compressed fluid supply is then utilized to actuate means to return the control piston to its original position, thereby closing the main valve and opening the exhaust from the working cylinder. This opening of the exhaust permits the working piston to return to its original position, and will ultimately permit the control piston to be returned to its second position, thereby repeating the above cycle.

A fastener applying device according to this invention has been illustrated in FIGURE 1. This device includes a casting having a handle portion indicated generally at 10, a body portion indicated at 12, and a nose portion indicated generally at 14. A portion of a conventional magazine for feeding a succession of staples into the nose section 14 has been indicated at 16.

The handle portion 10 defines a large air reservoir 18 which is connected as at 20 to a suitable supply of air under pressure.

Fixed within the body portion 12 is a sleeve 22 which defines the working cylinder. At its lower end, the cylinder includes the resilient piston stop 24, which is relieved about its periphery as indicated at 26.

The upper end of the main section 12 is closed by the cap 28 which, in the preferred embodiment of the invention, includes the magnet 30.

Reciprocable within the sleeve 22 is the working piston 32 which carries the fastener driver 34.

The annular space between the walls of the body portion 12 and the sleeve 22 defines an air return reservoir 36. It will be seen that this reservoir communicates with the working cylinder (the interior of sleeve 22) via the ports 38 disposed adjacent the relieved portion 26 of the piston stop, and the ports 40 which are normally closed by the O ring 42. As explained in the U.S. Patent referred to above, the port 40 and O ring 42 in effect provide a one way valve. It will be noted that these valves are located in the sleeve 22 at points which are spaced above the top surface of the piston stop 24 by a distance very slightly greater than the thickness of the working piston 32.

Referring now particularly to the lower portion of FIGURE 1, it will be observed that the nose portion 14 defines a drive track 44 in which the driver 34 reciprocates. It will be understood that suitable clearance is provided between the driver and the drive track so that the air on the under side of the piston 32 can exhaust to atmosphere via the drive track on the down or working stroke of the piston.

The control valve assembly of the tool is indicated in FIGURE 1 at 46. This main valve assembly is shown in detail in FIGURES 2 through 6, and will be described hereinafter. For present purposes, the main valve assembly serve to both control the admission of fluid under pressure from the reservoir 18 and passage 48 into the working cylinder via the passage 50, and to control the exhaust from the working cylinder via the passage 50 and the exhaust tube 52.

Opening and closing of the main valve is controlled by the remote valve assembly indicated generally at 54. This assembly communicates with the reservoir 18 through the passage 56. Upon actuation of the manual trigger 58, the valve is opened to permit a portion of the fluid in the reservoir to pass to the control valve assembly.

Referring now to FIGURES 2 through 6, the control valve of this invention will now be described in detail. It includes the sleeve 66 which is press fitted into the casting. The sleeve 66 is provided with the slotted opening 68 and 70 which communicate respectively with the passages 50 and 52. It will be observed that the upper end of the sleeve 66 serves as a seat for the resilient valve member 72, the coaction of the resilient member 72 and the upper end of the sleeve 66 serving to control the passage of compressed fluid from the reservoir to the working cylinder via the passages 48 and 50.

The resilient element 72 is carried by the main valve member 74. The member 74 is slidable about the depending hollow stem 76 which is secured in any suitable manner to the cap 78 which is threadly secured to the casting. The spring 80 serves to normally bias the main valve member 74 and resilient element 72 into the closed position shown in FIGURE 2.

Threadedly received in the depending stem 76 is the throttle control member 82, provided at its upper end with the slot 84 and at its lower end with the tapered end 86. It will be understood that by means of a screw driver or the like, the position of the tapered portion 86 in the bore 88 can be adjusted, thereby regulating the quantity of compressed fluid passing therethrough.

Slidable within the lower portion of the sleeve 66 is the control piston 90. The control piston 90 is in turn slidably mounted upon the annular extension 92 of the bottom cap 94, which is threadedly secured to the casting.

Finally, the oscillating stem 96 is slidable within a central bore in the bottom cap 94.

Operation of the control valve assembly will be as follows. Once the manual trigger 58 has been actuated, compressed air from the handle reservoir 18 will pass through the remote control valve into the passage 64. This compressed air can then pass through the passages 98 in the bottom cap 94 into the relieved area 96a in the central portion of the oscillating stem. It will be observed that this air will then act on the shoulders 96b at the upper end of the relieved area and the shoulder 96c at the lower end; inasmuch as the diameter of shoulder 96b is clearly larger than the diameter of shoulder 96c, the resultant force will be effective to move the oscillating stem up to the position shown in FIGURE 3. The O rings 100 and 102 are so arranged that the O ring 100 will engage the upper extremity of the relieved portion 104 in the bore of the bottom cap 94 at the same time the O ring 102 enters the relieved area 104. Once the O ring 102 enters the relieved area 104, the compressed air in the relieved area 96a can pass around the O ring 102, into the relieved area 104, through the passage 106, and into the area below the bottom surface of the control piston 90. This is operative to force the control piston upwardly, first to the position shown in FIGURE 4 wherein the topmost end of the control piston 90 contacts the lowermost end of the main valve member 74, and thence to the full up position shown in FIGURE 5, wherein the resilient element 72 has been lifted off of the end of sleeve 66, permitting the compressed air to flow from the passage 48, past the resilient element 72, into the passage 50 and thence into the working cylinder.

It will be noted that in the position shown in FIGURE 4, the uppermost end of the control piston 90 is just beyond the top edge of slots 70 in sleeves 66. Movement of the upper end of control piston 90 beyond this point will effectively seal the communication between the working cylinder and the exhaust tube 52. It will be noted that this sealing of the exhaust takes place immediately prior to the lifting of the resilient element 72 off the end of sleeve 66.

As explained before, the lifting of the resilient element 72 off the end of sleeve 66 permits the fluid under pressure to flow into the working cylinder via the passages 48 and 50. A portion of this compressed air will pass through the port 108 in the main valve member 74, and into the relieved area 76a, through the port 110 in the central stem, past the tapered end 86 of the throttle valve, and into the passage 88.

The lowermost end of the passage 88 communicates with the space above the top surface 96d of the stem 96. As the pressure of the compressed fluid in the passage 88 increases, it will overcome the force holding the stem 96 up (the diameter differential between the shoulders 96b and 96c), thereby forcing the stem down to the position shown in FIGURE 2. The spacing of the O rings 100 and 102 is again such that the O ring 102 will contact the lower edge of the relieved portion 104 at the same time the O ring 100 is entering the upper edge of the relieved portion 104. This action will therefor cut off the passages 106 from the supply of air via passages 98 and relieved area 96a, and will open these passages to atmosphere via the passages 112 and 114 in the stem.

At this time, the compressed air in the passage 50 will be acting on the upper end 90a of the control piston. When the pressure acting on the lowermost end is relieved through the passages set forth above, the control piston will be moved to the lowermost position shown in FIGURE 2. In returning to this position, it will be understood that the main valve member 74 and resilient element 72 are first seated against the upper end of sleeve 66; very shortly thereafter the uppermost end of the control piston will open the exhaust slot 70 of sleeve 66, permitting the compressed air in the working cylinder to exhaust.

Referring again briefly to FIGURE 1, it will be understood that when the main piston 32 has reached the lowermost position, the compressed air in the working cylinder will pass through the normally closed ports 40 and into the air return reservoir 36. When the air in the working cylinder is exhausted as explained above, the air in the return reservoir 36 will act through the ports 38 and the relieved area 26 on the under side of the piston 32, forcing the piston to return to its original position. This air return principle is explained more fully in the United States patent referred to above.

Returning now to the control valve of this invention, at the same time the air in the working cylinder is exhausted to atmosphere, the air acting on surface 96d of the stem will also be exhausted to atmosphere via the passage 88, the slot 110, the relieved area 76a, port 108, slots 70 and exhaust tube 52. When this pressure is relieved, the area differential between shoulders 96b and 96c will cause the stem 96 to move to the upper position as explained earlier in this specification. It will be apparent that when the stem 96 returns to the uppermost position shown in FIGURE 3, the cycle described above will repeat. It should also be apparent that the tool will continue to cycle repetitively so long as the manual trigger 58 remains actuated.

Once the manual trigger 58 is released, the supply of compressed air from the remote valve assembly 54 through the passage 64 is cut off. Therefore, when the stem 96 is forced to its lowermost position by compressed fluid in the passage 88, it will vent the compressed air trapped under and holding the control piston 90 in its uppermost position as explained before. The control piston will be returned to its lowermost position, the main valves 72–74 will be seated, and the components will remain in this position until the trigger is actuated again.

It will be understood that the operation of the control valve assembly just described is extremely rapid. That is, a prototype device embodying the construction shown has been found to drive in excess of 1500 staples per minute. While the operation of the valve is extremely fast, it will also be understood that the sequence and timing of the opening and closing of the various valves as described above constitute an important aspect of this invention.

It will be recognized that many modifications may be made in this invention without departing from its scope and spirit. Accordingly, no limitations are intended except insofar as specifically set forth in the claims which follow.

The embodiments of the invention in which an exclusive property or privilege is claimed are defined as follows:

1. In a fastener applying device for use with a supply of fluid under pressure and including a working cylinder having fastener driver means reciprocable therein in a cycle including one working and one return stroke, means for feeding a fastener into position to be driven after each return stroke of said fastener driver means main valve means for controlling the flow of said fluid under pressure into said working cylinder above said fastener driver means, and exhaust means for said working cylinder above said fastener driver means, the improved control structure comprising:
   (a) a control piston movable from an original position to a second position effective to open said main valve means and to close said exhaust means; and
   (b) reciprocable means in said device for effecting movement of said control piston from said original position to said second position and back to said original position, said means including
      (i) first passage means in said device for utilizing a portion of said fluid under pressure to effect movement of said reciprocable means, whereby to effect movement of said control piston to said second position to open said main valve means and close said exhaust means; and
      (ii) second passage means in said device for utilizing a portion of said fluid under pressure to effect movement of said reciprocable means to permit the return of said control piston to its original position, said return of said control piston to said original position effecting the closing of said main valve means and re-opening said exhaust means.

2. The device claimed in claim 1 wherein movement of said control piston to said second position closes said exhaust means before opening said main valve.

3. The device claimed in claim 2 wherein said control piston is slidable within a sleeve having an exhaust port, movement of said control piston past said exhaust port being effective to close said exhaust means.

4. The device claimed in claim 1 including means normally biasing said main valve to the closed position, wherein one end of said control piston is arranged to contact said main valve, and wherein the force moving said control piston is sufficient to overcome said biasing means and open said main valve.

5. The device claimed in claim 1 including manually actuated valve means for controlling communication between said supply of fluid and said first passage means.

6. The device claimed in claim 1 wherein said reciprocable means comprises an oscillating stem having a first position adapted to permit communication between one end of said control piston and said first passage means whereby to effect movement of said control piston to said second position, and having a second position adapted to effect communication between said one end of said control piston and atmosphere, whereby to permit the return of said control piston to its original position.

7. The device claimed in claim 6 wherein said oscillating stem includes a central portion of reduced diameter, one of the ends of said stem being larger than the other end, whereby fluid under pressure is effective to bias said oscillating stem to said first position.

8. A fastener applying device for use with a supply of fluid under pressure comprising:
   (a) a working cylinder;
   (b) fastener driver means reciprocable in said cylinder in a cycle including one working and one return stroke;
   (c) means for feeding a fastener into a position to be driven after each return stroke of said fastener driver means;
   (d) main valve means for controlling the flow of fluid under pressure into said working cylinder;
   (e) exhaust means for said working cylinder above said fastener driver means;
   (f) a control piston movable from an original position to a second position effective to open said main valve means and to close said exhaust means;
   (g) first passage means in said device for utilizing a portion of said fluid under pressure to effect movement of said control piston to said second position to effect the opening of said main valve means and to close said exhaust means; and
   (h) means in said device for utilizing a portion of said fluid under pressure to permit the return of said control piston to its original position, said return of said control piston to its original position closing said main valve and re-opening said first passage means.

9. In a fastener applying device for use with a supply of fluid under pressure and including a working cylinder having fastener driver means reciprocable therein in a cycle including one working and one return stroke; means for feeding a fastener into position to be driven after each return stroke of said fastener driver means; main valve means for controlling the flow of said fluid under pressure into said working cylinder; and exhaust means for said working cylinder above said fastener driver means; the improved control structure comprising:
   (a) a control piston movable from an original position to a second position effective to open said main valve means and to close said exhaust means;
   (b) passage means in said device for selectively permitting communication between said supply of fluid under pressure and one end of said control piston, and between said one end of said control piston and atmosphere;
   (c) oscillating means associated with said passage means and normally effective communication between said one end of said control piston and atmosphere, said oscillating means being movable to a second position to permit communication between said supply of fluid under pressure and said one end of said control piston;
   (d) manually actuatable valve means for effecting movement of said oscillating means to said second position; and (e) further passage means for utilizing a portion of said fluid under pressure for temporarily overcoming said means for effecting movement of said oscillating means and forcing said oscillating means to its original position.

10. The device claimed in claim 9 wherein movement of said control piston to said second position closes said exhaust means before opening said main valve.

11. The device claimed in claim 10 wherein said control piston is slidable within a sleeve having an exhaust port, movement of said control piston past said exhaust port being effective to close said exhaust means.

12. The device claimed in claim 9 including means normally biasing said main valve to the closed position, wherein one end of said control piston is arranged to contact said main valve and wherein the force moving said control piston is sufficient to overcome said biasing means and open said main valve.

13. In a fastener applying device for use with a supply of fluid under pressure and including a working cylinder having a fastener driver means reciprocable therein in a cycle including one working and one return stroke; means for feeding a fastener into position to be driven after each return stroke of said fastener driver means; main valve means for controlling the flow of said fluid under pressure into said working cylinder; and exhaust means for said working cylinder above said fastener driver means; the improved control structure comprising:

(a) a control piston movable from an original position to a second position effective to open said main valve means and to close said exhaust means;

(b) first passage means in said device for effecting communication between a portion of said control piston and said supply of fluid under pressure;

(c) second passage means in said device for effecting communicaiton between said portion of said control piston and atmosphere;

(d) means responsive to said supply of fluid under pressure for sequentially closing said second passage means and opening said first passage means, and closing said first passage means and opening said second passage means.

14. The device claimed in claim 13 wherein said means for sequentially closing said second passage means and opening said first passage means, and closing said first passage means and opening said second passage means comprises an oscillating stem having a first position adapted to permit communication via said first passage means between a portion of said control piston and said supply and to prevent communication via said second passage means between a portion of said control piston and atmosphere whereby to effect movement of said control piston to said second position, and having a second position adapted to effect communication via said second passage means between a portion of said control piston and atmosphere and to prevent communication via said first passage means between a portion of said control piston and said supply, whereby to permit the return of said control piston to its original position.

15. The device claimed in claim 14 including operator control means for moving said oscillating stem from said first position to said second position.

16. The device of claim 14 wherein said means for moving said oscillating stem comprises a manually actuated valve arranged to control the passage of fluid under pressure from said supply to said control piston via said first passage means.

References Cited

UNITED STATES PATENTS

| | | | |
|---|---|---|---|
| 2,983,922 | 5/1961 | Juilfs | 227—130 |
| 2,997,713 | 8/1961 | Anstett | 227—130 XR |
| 3,023,413 | 3/1962 | Fischer et al. | 227—130 XR |
| 3,084,672 | 4/1963 | Dalton | 227—130 XR |
| 3,278,103 | 10/1966 | Juilfs et al. | 227—130 |
| 3,278,104 | 10/1966 | Becht et al. | 227—130 |
| 3,313,213 | 4/1967 | Wandel | 227—130 |

GRANVILLE Y. CUSTER, JR., Primary Examiner